US 6,732,837 B2

(12) United States Patent
Wittkopp

(10) Patent No.: US 6,732,837 B2
(45) Date of Patent: May 11, 2004

(54) LUBRICATION CONTROL DEVICE

(75) Inventor: Scott Henry Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/794,933

(22) Filed: Feb. 28, 2001

(65) Prior Publication Data

US 2002/0117356 A1 Aug. 29, 2002

(51) Int. Cl.[7] ............................................. F16N 27/00
(52) U.S. Cl. ......................................... 184/7.4; 184/6.12
(58) Field of Search ................... 184/7.4, 6.12, 184/11.1, 13.1

(56) References Cited

U.S. PATENT DOCUMENTS

| | | | | |
|---|---|---|---|---|
| 4,635,489 A | * | 1/1987 | Imamura et al. ............... 74/7 E |
| 4,790,213 A | * | 12/1988 | Lasoen ......................... 475/328 |
| 5,188,576 A | | 2/1993 | Maguire et al. ............. 475/348 |
| 5,830,098 A | | 11/1998 | Kimes ......................... 475/159 |
| 6,398,509 B1 | * | 6/2002 | Okazaki et al. ............. 417/44.1 |

* cited by examiner

Primary Examiner—David Fenstermacher
(74) Attorney, Agent, or Firm—Leslie C. Hodges

(57) ABSTRACT

An automatic transmission is comprised of a housing and a hub rotatable about a shaft at differing speeds and having an axial assembly gap therebetween. The axial assembly gap defines an annular flow path in fluid communication with a source lubrication path and a lubrication-requiring mechanism. A lubrication control device is disposed in the annular flow path. The device includes a washer in constant contact with the housing and having a radial slot to permit a prescribed flow of lubricant through the annular flow path to the lubrication-requiring mechanism. The device further includes a belleville spring wherein a small diameter end is in contact with the hub and a large diameter end is piloted by a seating on the washer, wherein the belleville spring provides spring adjustability to accommodate the variable axial assembly gap.

4 Claims, 3 Drawing Sheets

LUBRICATION CONTROL DEVICE

TECHNICAL FIELD

The invention relates to lubrication control device for use in power transmissions.

BACKGROUND OF THE INVENTION

Lubrication distribution is an important consideration when designing an automobile transmission. Lubricant acts to cool friction-engaging devices such as clutches and brakes. For durability and wear performance, it is desirable to have a consistent, controlled flow of lubricant to the required device without delivering more than is needed, as this will siphon lubricant from other areas of the transmission requiring lubrication. Therefore it is desirable to position a device between two structures adjacent a lubrication flow path to control the flow of lubricant to a downstream lubricant-requiring mechanism. A controlled flow thrust bearing may control flow but it is not capable of accommodating varying assembly gaps. Thus it requires a set assembly gap. Therefore a lubrication control device which further accommodates and accounts for varying assembly gap tolerances in between the structures is desirable.

SUMMARY OF THE INVENTION

The present invention is for a lubrication control device usable in an automatic transmission to control the rate of lubrication flow between two housings of varying assembly gap and differential rotational speeds. The gap between the housings defines an annular flow path in which the lubrication control device is situated. The lubrication control device is a two-piece device including a washer and a belleville spring. The washer is in constant contact with the first housing and has one or more radial slots to permit a prescribed flow of lubricant through the annular flow path to the lubrication-requiring mechanism. The belleville spring operates to account for varying assembly gap differences between the housings. One end of the spring is in contact with the second housing and the other end is piloted by a seating on the washer, wherein the belleville spring provides a spring force to maintain contact between the washer and first housing. This ensures that there is no flow leakage around the lubrication control device. Instead a precise rate of lubricant flows through the radial slots to the lubricant-requiring mechanism.

DESCRIPTION OF THE PREFERRED EMBODIMENT

Figure 1:
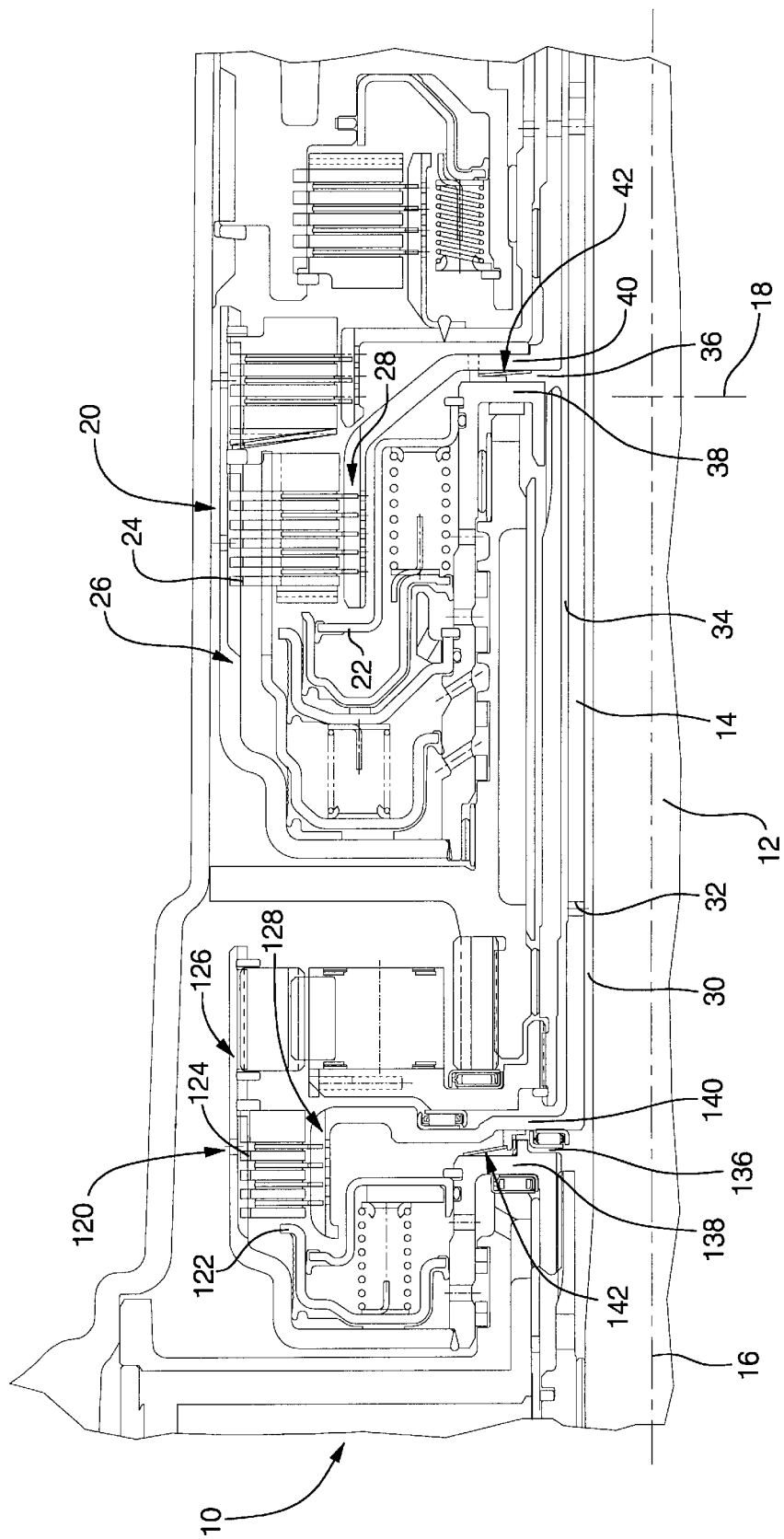
FIG. 1 is a cross section of a portion of an automatic transmission including lubrication control devices of the present invention.

The automatic transmission of FIG. 1 shown generally as 10, includes two concentric rotating shafts 12, 14 defining an axial direction 16 and a radial direction 18. The transmission 10 includes several torque transmitting mechanisms such as clutches and brakes. These mechanisms are lubrication-requiring mechanisms as they need lubricant to cool their temperature after friction engagement. A first clutch 20 is a rotary torque transmitting mechanism which includes a fluid operated, axially translating piston 22 and a plurality of friction plates 24 alternately mounted to a first clutch housing 26 and to a first clutch hub 28. The first clutch housing 26 and first clutch hub 28 are concentric with and rotate about the shafts 12,14. The housing 26 and hub 28 may rotate at differential speeds, where one may not rotate at all.

A source lubrication path 30 is created between the concentric shafts 12,14. Lubricant is forced centrifugally from the source lubrication path 30, through a radial feed passage 32, to a second source lubrication path 34. An annular flow path 36 in fluid communication with the secondary source lubrication path 34 is defined by the axial assembly gap between a radial housing wall 38 and an adjacent radial hub wall 40 of the first clutch housing and hub 26,28 respectively. The annular flow path 36 provides a path to the first clutch friction plates 24 for lubrication.

Figure 2:
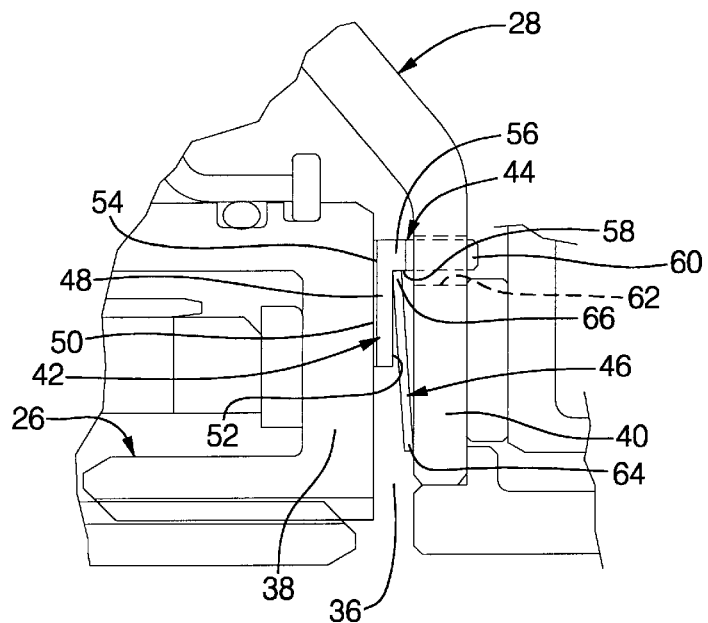
FIG. 2 is an enlarged cross section of a portion of FIG. 1 including a first embodiment of the lubrication control device.

To control the flow of lubrication between the housing 26 and hub 28 in the annular flow path 36, a lubrication control device 42 is disposed therein, in constant contact with the housing wall 38 and hub wall 40 as best shown in FIG. 2. In this region, the housing wall 38 and hub wall 40 are approximately parallel and spaced axially adjacent with a prescribed manufacturing tolerance, which may be on the order of ±2.5 mm for example.

Figure 3:
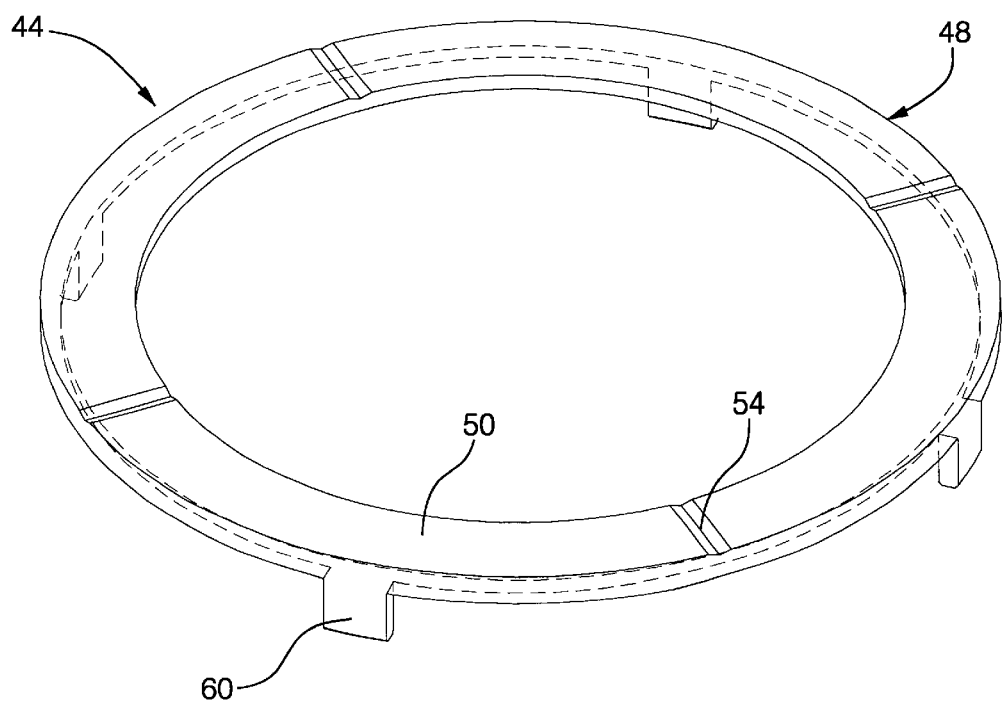
FIG. 3 is an isometric view of the washer of FIG. 2.

The lubrication control device 42 is comprised of a washer 44 and a belleville spring 46. The washer 44 is configured as an annular disk portion 48 defined by its two sides, a lubrication side 50 and a securing side 52. The lubrication side 50 is in constant contact with the housing wall 38 and includes one or more radial slots 54 (shown in FIG. 3 with four slots). The radial slots 54 are sized to permit a prescribed amount of lubricant to flow through the lubrication control device 42 to the lubrication-requiring mechanism —here the first clutch 20. The securing side 52 of the washer 44 includes a seating flange 56 extending axially about the circumference of the securing side as shown in FIG. 2. The seating flange 56 is defined by an inner axial wall 58 to provide a seat for the belleville spring 46 described in further detail below.

A means for securing the washer 44 to the clutch hub 28 in the rotational direction such that the washer rotates with the clutch hub is provided. In this embodiment, one or more tabs 60 (shown in FIG. 3 with four tabs) extend axially from the seating flange 56 and are inserted in corresponding windows 62 in the clutch hub 28. There is minimal clearance in the rotational direction between the tabs 60 and their corresponding windows 62. The washer 44 is composed of a non-steel material such as bronze or plastic so as not to weld the lubrication side 50 of the washer 44 to the clutch housing 26 when the housing and hub 28 rotate at relative speeds.

The belleville spring 46 of the lubrication control device 42 is a frusto-conical configuration where the small diameter end 64 is in contact with the clutch hub 28 as a reaction surface. The large diameter end 66 is piloted by the inner axial wall 58 of the seating flange 56 and contacts the securing side 52 of the washer 44.

It is desirable for the washer 44 and spring 46 to rotate together and not independently where the parts could wear.

Since the spring 46 reacts against the clutch hub 28, the rotational securing means of the washer is between the washer 44 and the clutch hub 28 to ensure the spring and washer rotate together with the clutch hub.

The spring 46 is composed of a material which is tolerant of transmission operating temperatures while being loaded. One such material is bronze. The spring force of the belleville spring 46 operates to maintain constant contact between the lubrication side 50 of the washer 44 and the housing wall 38. Therefore lubricant may only flow through the washer radial slots 54 and not through the variable assembly gap between the washer 44 and housing 26. Instead a precise and limited rate of lubricant flows through the lubrication control device 42 to the lubrication-requiring mechanism. The stroke of the spring 46 is determined by the maximum and minimum assembly gaps between the housing 26 and hub 28. Further the spring 46 is a solid ring with no orifices therethrough.

The second embodiment of a lubrication control device demonstrates a second washer configuration to accommodate a second means for securing the washer to the adjacent housing for rotation therewith. As illustrated in FIG. 1, a second clutch 120 is a rotary torque transmitting mechanism which includes a fluid operated, axially translating piston 122 and a plurality of friction plates 124 alternately mounted to a second clutch housing 126 and to a second clutch hub 128. The second clutch housing and hub 126,128 are concentric with and rotate about the shafts 12,14. The housing 126 and hub 128 may rotate at differential speeds.

Figure 4:
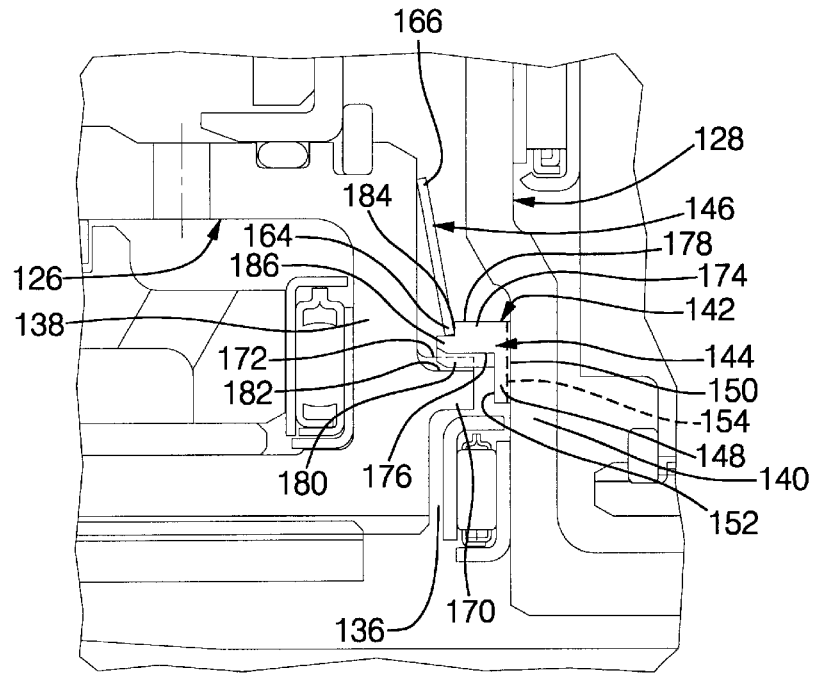
FIG. 4 is an enlarged cross section of a portion of FIG. 1 including a second embodiment of the lubrication control device.

An annular flow path 136 in fluid communication with the source lubrication path 30 is defined by a second radial housing wall 138 and a second radial hub wall 140 of the second clutch housing and hub 126,128 respectively. The annular flow path 136 provides a path to the second clutch 120 for lubrication. In the instance shown, the radial housing wall 138 includes an axial protrusion 170 defining an axial washer flange wall 172, best shown in FIG. 4.

Figure 5:
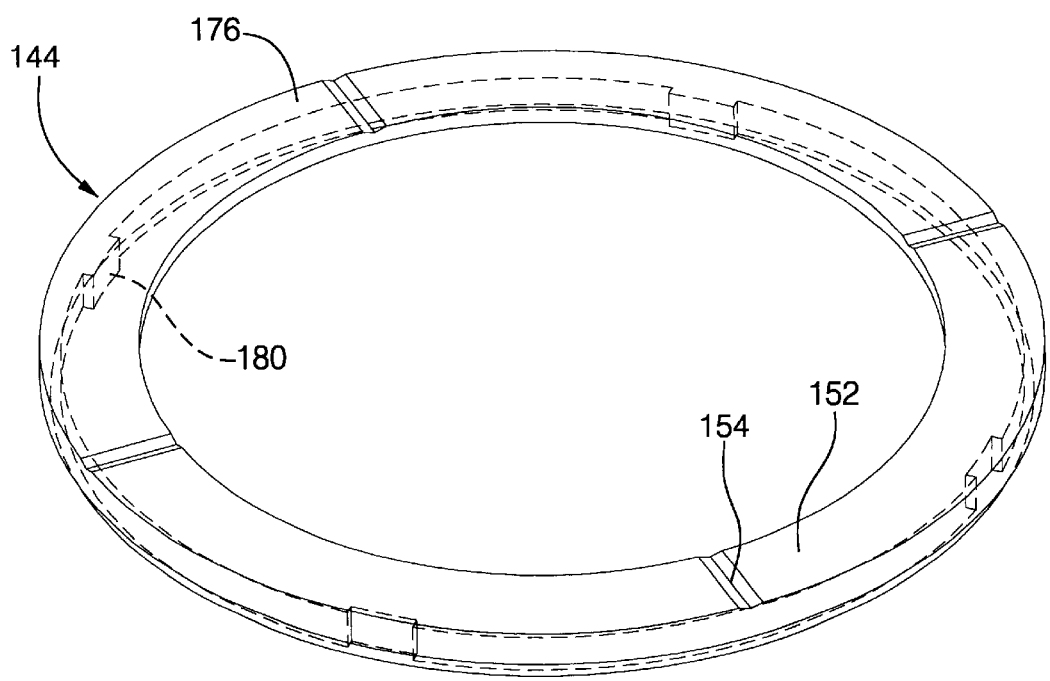
FIG. 5 is an isometric view of the washer of FIG. 4.

The lubrication control device 142 is comprised of a washer 144 and a belleville spring 146. The washer 144 is configured as an annular cup with an annular disk portion 148 and a cylinder portion 174 extending axially from the outer circumference of the disk. The annular disk 148 is defined by a lubrication side 150 and a securing side 152, the side from which the cylinder 174 extends. The lubrication side 150 is in constant contact with the hub wall 140 and includes two or more radial slots 154 (shown in FIG. 5 with four slots). The radial slots 154 are sized for a precise orifice area to control the rate of lubricant flow between the clutch housing and hub 126,128, through the lubrication control device 142 to the mechanism requiring lubrication—here the second clutch 120. The cylinder portion 174 is defined by an inner cylindrical wall 176 and an outer cylindrical wall 178. The inner cylindrical wall 176 includes a means for securing the washer 144 to the clutch housing 126, and more particularly to the axial washer flange wall 172 of the axial protrusion 170. As shown in FIG. 5, one or more keys or protuberances 180 are included along the inner cylindrical wall 176 of the washer 144 to extend in corresponding key slots 182 in the axial washer flange wall 172 of the clutch housing 126 to ensure that the washer rotates with the clutch housing.

The outer cylindrical wall 178 of the washer 144 includes an inward shoulder 184 about the open end 186 to provide a seat for the belleville spring 146, and more specifically the small diameter end 164 of the frusto-conical spring. The large diameter end 166 contacts the clutch housing 126. The spring force of the belleville spring 146 operates to maintain contact between the washer 144 and the clutch hub 128; therefore there is no additional variable flow path for lubricant. Instead a precise rate of lubricant flows through the lubrication control device.

Therefore the present invention is for a lubrication control device having particular suitability in a transmission between two housings rotating at differential speeds. The control device is capable of providing a precise flow path of lubrication from a lubrication source to a lubrication-requiring mechanism. To accomplish this precision, the control device is capable of accommodating assembly gap variances between the adjacent housings.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An automatic transmission, comprising:
   a source lubrication path for lubricant, a housing and a hub rotatable about a shaft at differing speeds and having a variable axial assembly gap therebetween, said axial assembly gap defining an annular flow path in fluid communication with said source lubrication path and a lubrication-requiring mechanism, a lubrication control device disposed in said annular flow path and in constant contact with said housing and said hub and having spring adjustability to accommodate said variable axial assembly gap, a means for securing said lubrication control device to said hub for rotation therewith, and said lubrication control device having a radial slot to permit a prescribed flow of lubricant between said lubrication control device and said housing, through said annular flow path, to said lubrication-requiring mechanism.

2. A transmission, as defined in claim 1, wherein said lubrication control device is comprised of a washer having an annular disk portion defined by a lubrication side and a securing side, said lubrication side in constant contact with said housing and having said radial slot, said securing side having a seating flange extending axially about the circumference of said securing side, and a belleville spring having a small diameter end in contact with said hub and a large diameter end piloted by said seating flange to contact said securing side of said washer, wherein said belleville spring provides spring adjustability to accommodate said variable axial assembly gap, and said means for securing said lubrication control device to said hub for rotation therewith comprising a window in said hub and a tab extending axially from said seating flange through said window for rotating said washer with said hub.

3. A transmission, as defined in claim 2, wherein said spring is comprised of bronze.

4. A lubrication control device for controlling lubrication flow between a housing and a hub in an automatic transmission, comprising:

a washer having an annular disk portion defined by a lubrication side and a securing side, said lubrication side in constant contact with said housing and having a radial slot, said securing side having a seating flange extending axially about the circumference of said securing side, and a belleville spring having a small diameter end in contact with said hub and a large diameter end piloted by said seating flange to contact said securing side of said washer, wherein said belleville spring provides spring adjustability to accommodate variable axial assembly gap between said housing and hub, and a means for securing said lubrication control device to said hub for rotation therewith comprising a window in said hub and a tab extending axially from said seating flange through said window for rotating said washer with said hub.

* * * * *